United States Patent [19]

Walinsky

[11] Patent Number: 4,710,537

[45] Date of Patent: Dec. 1, 1987

[54] SUBSTANTIALLY HOMOGENEOUS COPOLYMERS OF ACRYLIC OR METHACRYLIC ACID AND MALEIC ACID

[75] Inventor: Stanley W. Walinsky, Mystic, Conn.

[73] Assignee: Pfizer Inc., New York, N.Y.

[21] Appl. No.: 786,422

[22] Filed: Oct. 11, 1985

Related U.S. Application Data

[60] Division of Ser. No. 476,668, Mar. 18, 1983, Pat. No. 4,547,559, which is a continuation-in-part of Ser. No. 232,475, Feb. 9, 1981, Pat. No. 4,390,670.

[51] Int. Cl.$^4$ .................. C08F 8/12; C08F 122/02
[52] U.S. Cl. .................. 524/549; 525/327.8; 526/271; 210/701
[58] Field of Search .................. 526/271, 240, 311; 525/327.8; 524/549; 252/175; 210/701

[56] References Cited

U.S. PATENT DOCUMENTS

| | | | |
|---|---|---|---|
| 2,971,939 | 2/1961 | Baer | 526/271 X |
| 3,635,915 | 1/1972 | Gale | 260/78.5 R |
| 3,715,307 | 2/1973 | Johnson et al. | 210/58 |
| 3,755,264 | 8/1973 | Testa | 526/271 X |
| 4,137,389 | 1/1979 | Wingler et al. | 526/87 X |
| 4,200,720 | 4/1980 | Evani et al. | 526/271 X |
| 4,223,120 | 9/1980 | Kurowsky | 526/271 X |
| 4,314,044 | 2/1982 | Hughes et al. | 526/318.2 X |
| 4,390,672 | 6/1983 | von Bonin | 526/271 X |
| 4,526,945 | 7/1985 | Carlson et al. | 526/145 |
| 4,559,159 | 12/1985 | Denzinger et al. | 526/271 X |

FOREIGN PATENT DOCUMENTS

| | | |
|---|---|---|
| 1495850 | 11/1969 | Fed. Rep. of Germany . |
| 52-78695 | 7/1977 | Japan . |
| 7506874 | 12/1975 | Netherlands . |
| 1414918 | 11/1975 | United Kingdom . |
| 1519512 | 7/1978 | United Kingdom . |

OTHER PUBLICATIONS

"Water-Soluble Polymers", Bikales, N. M. (ed.), Plenum Press, N.Y. (1973), p. 152.

Primary Examiner—Joseph L. Schofer
Assistant Examiner—F. M. Teskin
Attorney, Agent, or Firm—Peter C. Richardson; Lawrence C. Akers; Harold W. Ordway

[57] ABSTRACT

Substantially homogeneous acrylate/maleate copolymers of number average molecular weight of 500 to 5000 are prepared by copolymerizing 35 to 65 mole percent acrylic or methacrylic acid with 65 to 35 mole percent maleic anhydride at 80° to 150° C. in the presence of a polymerization initiator and a chain-transfer solvent such that both the monomers and the formed polymer remain in solution and the mole ratio of the acrylic or methacrylic acid monomer to the maleic anhydride monomer in the solvent is maintained below about 0.2 throughout the polymerization. The copolymers in hydrolyzed form are employed at a level of from about 0.1 to 100 ppm for prevention of alkaline calcium and magnesium scale formation, such as during seawater evaporative desalination.

2 Claims, 2 Drawing Figures

Example 1
40/60 Methacrylic Acid/Maleic Acid
C = Homogeneous Copolymer Product
S = Elution Solvent
M = Residual Monomer

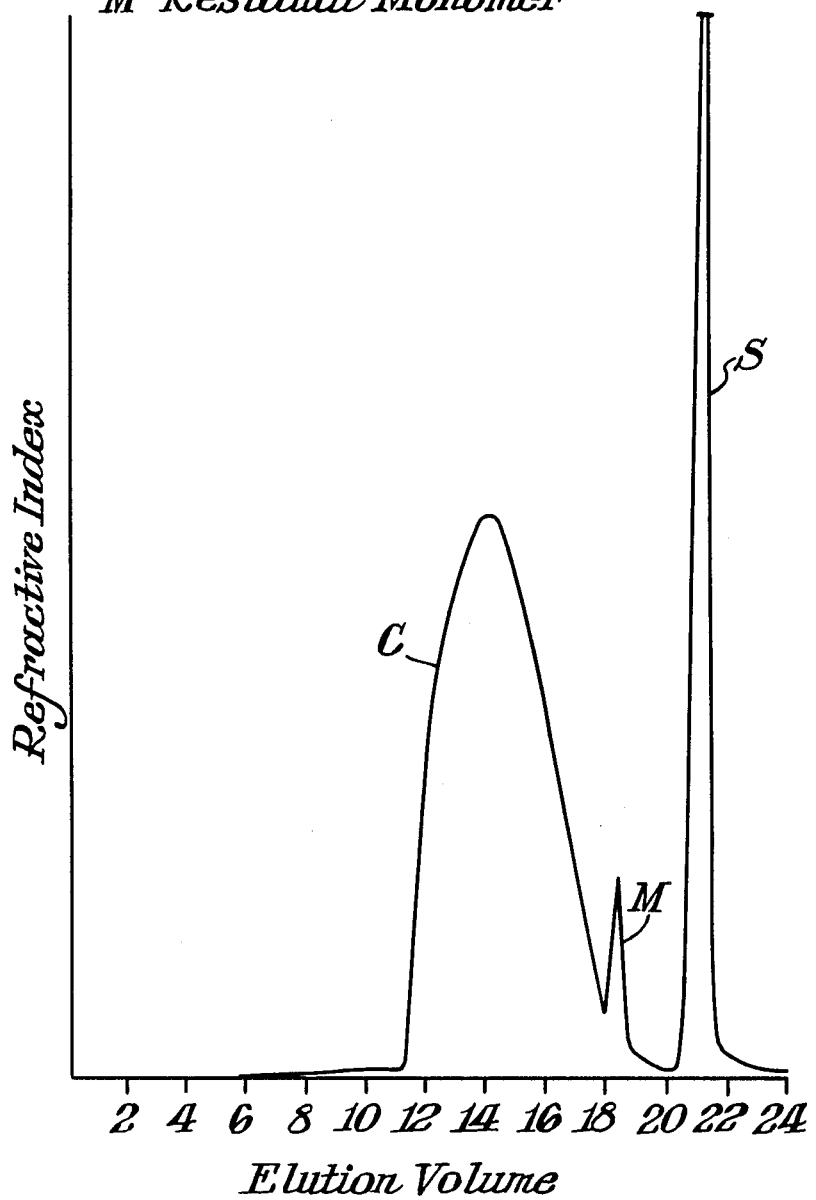

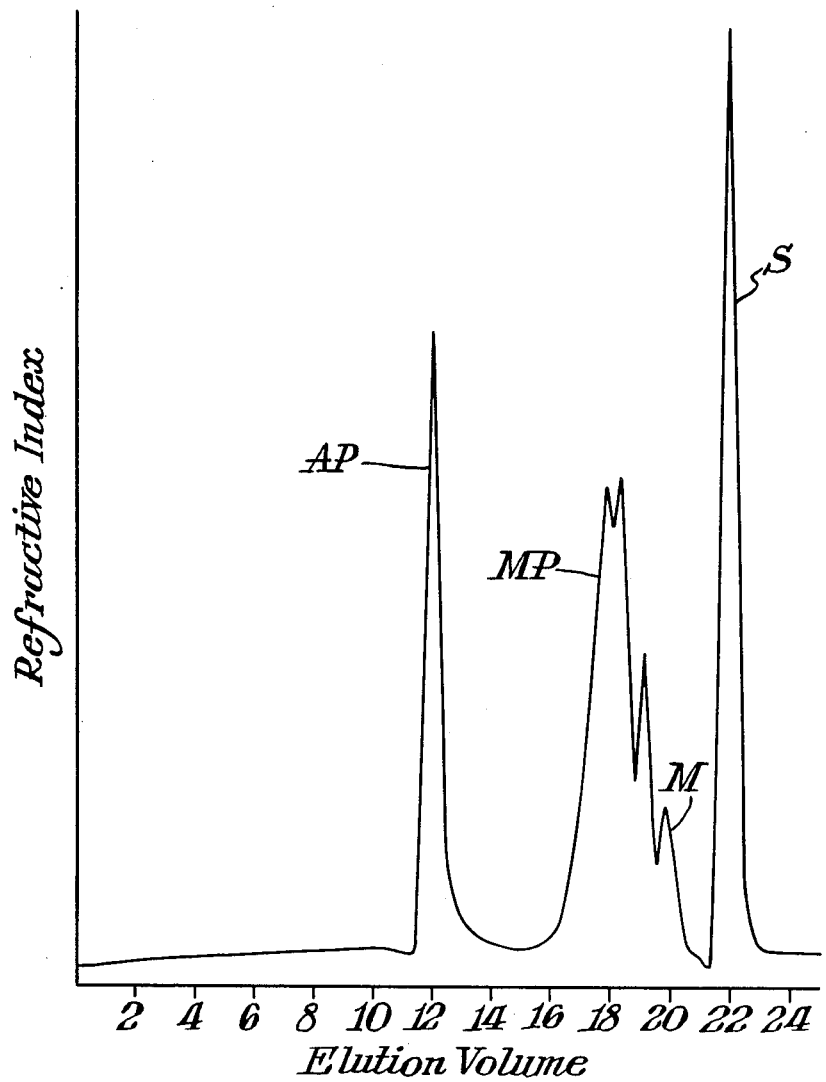

SUBSTANTIALLY HOMOGENEOUS COPOLYMERS OF ACRYLIC OR METHACRYLIC ACID AND MALEIC ACID

This is a division of application Ser. No. 176,668, filed on Mar. 18, 1983, now U.S. Pat. No. 4,547,559.

BACKGROUND OF THE INVENTION

This invention relates to novel copolymers of maleic anhydride with acrylic or methacrylic acid, a process for their preparation and their use in hydrolyzed form as antiscalants.

Aqueous systems containing dissolved mineral salts are commonly employed in operations such as heating, cooling and evaporative distillation which involve heat transfer. The salts often become insoluble during the operation and are deposited as scale on the heat transfer surfaces, resulting in reduced heat transfer and eventual failure of the equipment. In general, the mineral scale salts are derived from alkaline earth and other metal cations such as calcium, magnesium, iron and lead, and from anion such as bicarbonate, carbonate, hydroxide, sulfate and phosphate. Many factors influence scale formation and include, for example, the pH of the water, the nature of the dissolved salts and the temperature of the operation.

Numerous additives have been proposed as inhibitors of mineral scaling. Included are polymaleic acid and copolymers of maleic acid with such as acrylic and methacrylic acids. A variety of approaches to the preparation of these acrylate/maleate copolymers has been reported, such preparations being disclosed, for example, in U.S. Pat. Nos. 3,635,915 and 3,755,264, British patent specification No. 1,414,918 and Netherlands application No. 7506874. The disclosed preparations, however, result in a product which is not a true copolymer but rather a mixture of essentially homopolymers. It is therefore an objective of the present invention to provide a process for the preparation of substantially homogeneous acrylate/maleate copolymers which have improved antiscalant activity and reduced residual monomer content.

SUMMARY OF THE INVENTION

I have now found that by proper selection of the polymerization solvent and by careful control of the monomer ratio in the solvent during the polymerization, substantially homogeneous copolymers of acrylic or methacrylic acid, or mixtures thereof, with maleic anhydride may be readily prepared.

Accordingly, the present invention entails a process for preparing a substantially homogeneous acrylate/maleate copolymer of number average molecular weight of from about 500 to 5000 which comprises copolymerizing from about 35 to 65 mole percent acrylic or methacrylic acid monomer with from about 65 to 35 mole percent maleic anhydride monomer over a period of from about 0.3 to 10 hours at a temperature of from about 80° to 150° C. in the presence of from about 5 to 25 weight percent polymerization initiator, based on the total weight of the monomers, and from about 45 to 90 weight percent of chain-transfer solvent, based on the total weight of the monomers, initiator and solvent, the solvent and the mode of addition of the monomers to the solvent being such that the monomers and copolymer remain in solution in the solvent, and the mole ratio of the acrylic or methacrylic acid monomer to the maleic anhydride monomer in the solvent is maintained at from about 0.005 to 0.2, throughout the polymerization period.

In preferred embodiments of the process, from about 40 to 50 mole percent methacrylic acid monomer is copolymerized with from about 60 to 50 mole percent maleic anhydride monomer; the initiator is di-t-butyl peroxide; the solvent is selected from the group consisting of ketones, esters and ethers having from 4 to 10 carbon atoms, and mixtures thereof; and the mole ratio of the acrylic or methacrylic acid monomer to the maleic anhydride monomer in the solvent is maintained at from about 0.01 to 0.1. Preferably, the maleic anhydride monomer, the initiator and up to about 10 percent of the acrylic or methacrylic acid monomer are dissolved in the solvent and the remainder of the acrylic or methacrylic acid monomer is introduced over the polymerization period; the resulting copolymer solution is maintained at the polymerization temperature for from about 10 to 120 minutes following the monomer addition; from about 40 to 100 weight percent water, based on the weight of the final polymerization solution, is added to the solution while maintaining the polymerization temperature to hydrolyze the copolymer; and the hydrolyzed copolymer is recovered as an aqueous solution by removal of the solvent such as by distillation.

In an especially preferred embodiment of the process, from about 40 to 45 mole percent methacrylic acid monomer is added over a period of from about 2 to 4 hours to a solution of from about 60 to 55 mole percent maleic anhydride monomer, 10 to 20 weight percent di-t-butyl peroxide and 50 to 60 weight percent methyl isobutyl ketone at a temperature of from about 110° to 120° C., and the solution is held at that temperature for from about 15 to 90 minutes following the addition.

The present invention also entails a substantially homogeneous copolymer consisting essentially of from about 35 to 65 mole percent acrylic or methacrylic acid units and from about 65 to 35 mole percent maleic anhydride units and having a number average molecular weight of from about 500 to 5000. Preferably the copolymer has from about 40 to 45 mole percent methacrylic acid units and from about 60 to 55 mole percent maleic anhydride units, and is in the hydrolyzed form, or as an alkali metal, ammonium or amine salt thereof, as an aqueous solution containing from about 1 to 60 weight percent of the hydrolyzed copolymer.

The present invention further entails a method for the prevention of scale formation in water containing scale-forming impurities, such as in seawater for desalination, which comprises mixing with the water an effective amount of the hydrolyzed copolymer, preferably at a concentration of from about 0.5 to 10 ppm. The method may also comprise addition to the seawater of an amount of such as sulfuric acid to neutralize preferably from about 55 to 85 percent of the bicarbonate alkalinity of the seawater.

BRIEF DESCRIPTION OF THE DRAWINGS

Novel features and advantages of the present invention in addition to those mentioned above will become apparent from a reading of the following detailed description in conjunction with the accompanying drawings wherein:

FIG. 1 is a typical HPLC curve for a substantially homogeneous methacrylate/maleate copolymer prepared according to the present invention; and FIG. 2 is a typical HPLC curve for a methacrylate/maleate copolymer product prepared by a prior art copolymerization process.

DETAILED DESCRIPTION OF THE INVENTION

The novel polymerization process of the present invention, as described herein, provides for the first time essentially homogenous copolymers of controlled molecular weight from the copolymerization of major amounts of acrylic or methacrylic acid with maleic anhydride. In addition, these novel copolymers exhibit improved antiscalant activity and lower residual monomer content over the acrylate/maleate copolymers of the prior art, resulting in more efficient utilization and a greater degree of safety in their use, such as during the flash evaporation of seawater in preparing potable water.

Homogeneous copolymers are defined by the art as compositions of narrow molecular weight distribution. The distribution is readily determined by such analytical techniques as high pressure liquid chromatography (HPLC) and is essentially mononodal for homogeneous copolymers. Nonhomogeneous copolymers, on the other hand, characteristically have binodal distributions, particularly when the reactivities of the two monomers are very different as is the case with acrylic or methacrylic acid and maleic anhydride. When determined by HPLC, the molecular weight distribution of the substantially homogeneous copolymers of the present invention is essentially mononodal with the ratio of the weight average molecular weight ($MW_W$) to the number average molecular weight ($MW_N$) being less than 6.

In this process, from about 35 to 65 mole percent of either acrylic acid or methacrylic acid is copolymerized with from about 65 to 35 mole percent of maleic anhydride in the presence of specified amounts of chain-transfer solvent and polymerization initiator and at specified temperatures and polymerization times, the nature of the solvent and the method of addition of the monomers being selected to ensure that the polymerization mixture is essentially a solution at all times and that the ratio of the more reactive acrylic or methacrylic acid monomer to the maleic anhydride monomer in the solvent is maintained at a low value and within a specified range.

The chain-transfer solvent selected for the polymerization must meet certain criteria. It must be such that both the monomers and the resulting copolymer have substantially complete solubility in the solvent. It must be substantially unreactive to carboxylic acid and anhydride groups, thus excluding such solvents as alcohols and amines. It must be substantially unreactive to the monomer double bonds for those reactions of anionic nature such as addition of amines or thiols. Finally, it must be capable of radical chain transfer from the initiator and from the growing polymeric radical in order that the molecular weight of the formed polymer is kept low. A desirable, but not essential, characteristic of the solvent is a normal boiling point in the range of from about 80° to 150° C. This is so that the temperature is high enough without operating under pressure to cause a suitable radical production rate from initiator thermal decomposition; that low rather than high molecular weight polymer is formed; and that the solvent is readily removed from the copolymer product. In addition, water insolubility of the solvent is preferred to permit facile recovery of the copolymer product by extraction into the aqueous phase.

Preferably, the solvent is selected from ketones, esters and ethers having from 4 to 10 carbon atoms. Thus, ketones such as methyl isobutyl ketone, n-pentanone and n-hexanone, esters such as n-butyl acetate, diethyl phthalate and methyl benzoate, and ethers such as 1,2-diethoxyethane, 1,4-dioxane and diisopropyl ether, or mixtures thereof, may be used. The especially preferred solvent is methyl isobutyl ketone. The amount of chain transfer solvent employed is from about 45 to 90 weight percent of the total weight of the monomers, initiator and solvent.

To obtain a substantially homogeneous acrylate/maleate copolymer of the desired composition, a low ratio of the more reactive acrylic or methacrylic acid monomer to the maleic anhydride in the chain-transfer solvent must be maintained throughout the polymerization. This ratio may be calculated by the monomer reactivity ratio method described by P. J. Flory in "Principles of Polymer Chemistry", Cornell University Press, 1953, page 178. Employing this method together with available monomer reactivity ratios for copolymerizations of maleic anhydride and of methacrylic acid, it is calculated that the ratio of acrylic or methacrylic acid monomer to maleic anhydride monomer during the polymerization should be from about 0.005 to 0.2 for copolymers containing from about 35 to 65 mole percent maleic anhydride units with from about 65 to 35 mole percent acrylic or methacrylic acid units, and from about 0.01 to 0.1 for the preferred copolymers containing from about 40 to 60 mole percent maleic anhydride units with from about 60 to 40 mole percent methacrylic acid units.

In carrying out the present invention, it will often be appropriate to conduct one or more initial pilot polymerization runs in which reaction conditions are carefully recorded and in which samples of the reaction mixture are periodically withdrawn, rapidly chilled and assayed for acrylic or methacrylic acid monomer and maleic anhydride monomer content. In this fashion, it can be confirmed that the critical parameters of the invention have been achieved with regard to the ratio of acrylic or methacrylic acid monomer to maleic anhydride monomer. In subsequent runs, it will not be necessary to repeat the sampling procedure, but instead it will be most convenient to merely observe the various reaction parameters which conform to the successful pilot run. In practice, it has been found that the homogeneous copolymer of the present invention is achieved when the solvent, catalyst, total maleic anhydride monomer and up to 10 percent of the acrylic or methacrylic acid monomer are charged to the reaction vessel, the remainder of the acrylic or methacrylic acid monomer being introduced continuously over the course of the polymerization.

The polymerization initiator is preferably selected from dialkyl peroxides such as di-t-butyl peroxide, dicumyl peroxide, 2,5-dimethyl-2,5-bis(t-butylperoxy) hexane and 2,5-dimethyl-2,5-bis(t-butylperoxy) hexyne-3 and from diacyl peroxides such as benzoyl peroxide, lauroyl peroxide, 2,4-dichlorobenzoyl peroxide and succinic acid peroxide. The initiator is utilized at a level of from about 5 to 25 percent by weight of the combined monomers and is normally added in its entirety at the start of the polymerization. The preferred initiator is di-t-butyl peroxide at a level of about 10 to 20 weight percent of the monomer charge.

The temperature and duration of the polymerization are also influential in determining the nature of the resulting copolymer. The polymerization is therefore limited to temperatures of from about 80° to 150° C. for monomer addition periods of from about 0.3 to 10 hours. Since the presence of a minimum amount of monomer in the final product is desired, the final polymerization solution is generally maintained at the polymerization temperature for a period, preferably from about 10 to 120 minutes, following the completion of the monomer addition.

Preferred embodiments of the instant process include those in which from about 40 to 50 mole percent methacrylic acid is copolymerized with from about 60 to 50 mole percent maleic anhydride. In an especially preferred process, about 40 to 45 mole percent methacrylic acid is added continuously to a refluxing solution of from about 60 to 55 mole percent maleic anhydride and 10 to 20 weight percent di-t-butyl peroxide in from about 50 to 60 weight percent methyl isobutyl ketone at a temperature at from about 110° to 120° C. for from about 2 to 4 hours, and the final polymerization solution is held at the reflux temperature for an additional 15 to 90 minutes following completion of the methacrylic acid addition.

The essentially homogeneous copolymer consisting essentially of from about 35 to 65 mole percent acrylic or methacrylic acid units and from about 65 to 35 mole percent maleic anhydride units and having a number average molecular weight of from about 500 to 5000 may be isolated from the final polymerization solution by techniques well known to the art. But since the copolymer is conventionally used in hydrolyzed form, the instant process preferably entails hydrolyzing the copolymer by the addition of water to the final polymerization solution, normally in the amount of from about 40 to 100 weight percent of the solution, while the solution is still at the polymerization temperature. The resulting mixture may be held at or near the polymerization temperature, generally for a period of up to about 60 minutes, to assure complete hydrolysis. The solvent is then removed from the mixture, such as by phase separation or preferably distillation, depending upon the nature of the solvent, and the hydrolyzed copolymer recovered as such or in the form of an aqueous solution.

The hydrolyzed copolymer aqueous solution may be used as such or neutralized to form a solution of the alkali metal, ammonium or amine salt. Alkali metal bases suitable for the neutralization include sodium hydroxide, potassium hydroxide and lithium hydroxide, while suitable ammonium and amine bases include ammonia, ammonium hydroxide, mono-, di- and trialkyl amines having 1 to 5 carbon atoms in each alkyl group, pyridine, morpholine and lutidine. As an alternative to neutralization of the hydrolyzed copolymer solution in forming the salt, the base, except in the case of mono- and dialkyl amines, may be added with the hydrolysis water.

The essentially homogeneous hydrolyzed acrylate/maleate copolymer of the present invention, while having general scale-inhibiting properties, is especially useful in the prevention of alkaline calcium and magnesium scale formation in such processes as the desalination of seawater. In such use, the hydrolyzed copolymer is added to the water being treated in an effective amount, normally at a level from about 0.1 to 100 ppm and preferably from about 0.5 to 10 ppm, to inhibit scale formation. In such addition, the aqueous copolymer solution at about 1 to 60 weight percent hydrolyzed copolymer or salt equivalent thereof may be metered directly into the stream being treated, but preferably is diluted with water to a concentration of about 0.1 to 1 weight percent before being added. Evaluation of these essentially homogeneous, controlled low molecular weight copolymers has shown them to be superior to the acrylate/maleate copolymers of the prior art prepared by heterogeneous polymerization procedures.

Other additives commonly used in combination with threshold scale inhibitors are also effective with the novel inhibitors of the present invention. Especially useful are mineral acids, especially sulfuric acid, whereby part of the bicarbonate alkalinity present in such as seawater to be desalinated is neutralized; the extent of the bicarbonate neutralization is normally from about 30 to 85 percent, especially from about 55 to 85 percent. Foam control agents, corrosion inhibitors and oxygen scavengers, for example, may also be utilized with the novel scale control agents of the present invention.

The following examples are merely illustrative and are not to be construed as limiting the invention, the scope of which is defined by the appended claims.

EXAMPLE 1

To a 4-neck, 500 ml round bottom flask equipped with two reflux condensers, thermometer, nitrogen inlet, mechanical stirrer and constant-addition syringe drive pump were charged 204 g methyl isobutyl ketone, 100 g (1.02 mole) maleic anhydride and 25 g di-t-butyl peroxide. The flask was purged with dry nitrogen while the resulting solution was heated under agitation to reflux (about 115° C.), the system being maintained thereafter under a static nitrogen pressure. The continuous addition of 58 g (0.67 mole) of glacial methacrylic acid to the solution was started once the solution temperature reached 100° C., the acid addition continuing over a period of 3.3 hours. The polymerization solution was refluxed for 1.5 hours following completion of the methacrylic acid addition. Then 215 g of water was added to the refluxing solution, and the resulting mixture was distilled atmospherically to remove the methyl isobutyl ketone solvent and a portion of the water from the flask and produce an aqueous solution of hydrolyzed copolymer containing about 50 weight percent solids. The yield of hydrolyzed copolymer was 113 percent by weight based on the charged monomers, the greater than 100 percent yield resulting from the conversion of the anhydride to acid groups and the incorporation of solvent end groups into the polymer.

The chemical homogeneity and molecular weight distribution of the hydrolyzed copolymer were determined by high pressure liquid chromatography (HPLC) on a series of three 27.5 cm 60 A° Porasil gel permeation columns using an acetate-phosphate buffer eluant adjusted to pH 7.4 with 1 N aqueous sodium hydroxide and refractive index detection, the Porasil columns being calibrated with 1,2,3,4-butane-tetracarboxylic acid and Goodrite K 732 and K 752 polyacrylates of known molecular weight. The analysis, as shown graphically in FIG. 1, indicated the copolymer to be homogeneous with a weight average molecular weight of 2970 and a number average molecular weight of 960.

EXAMPLE 2

The preparation of Example 1 was repeated with the exception that 48.2 g (0.67 mole) of acrylic acid was substituted for the methacrylic acid. A homogeneous hydrolyzed acrylate/maleate copolymer of weight average molecular weight of 2730 and number average molecular weight of 890 was obtained in 119 weight percent yield.

EXAMPLE 3

The preparation of Example 1 was repeated with the exception that 204 g of 1,2-diethoxyethane (boiling point 121° C.) was substituted for the methyl isobutyl ketone solvent. Analysis of the aqueous copolymer solution indicated a 129 weight percent yield of homogeneous hydrolyzed methacrylate/maleate copolymer of weight average molecular weight of 1690 and number average molecular weight of 510.

EXAMPLE 4

To a 4-neck, 500 ml round bottom flask equipped as in Example 1 were added 50 g (0.51 mole) maleic anhydride, 8.0 g di-t-butyl peroxide and 150 g n-butyl acetate. The reaction system was purged with nitrogen and heated to reflux (about 120° C.). Once at reflux, 44 g (0.51 mole) methacrylic acid was added continuously to the solution over a 1-hour period. Reflux was maintained for an additional 7 hours. Then 220 g of water was added to the polymerization solution and the resulting mixture was held at about 90° C. for 1 hour. Agitation was stopped, the layers were allowed to separate, and the upper organic layer was decanted. The lower aqueous layer was reheated to and held at reflux (100° C.) for 6 hours, then atmospherically distilled to removed about 100 g of distillate and produce a 43 weight percent aqueous solution of homogeneous hydrolyzed methacrylate/maleate copolymer in 92 weight percent yield.

EXAMPLE 5

In a 3-neck, 300 ml round bottom flask equipped with reflux condenser, nitrogen inlet, mechanical stirrer and pressure-equalizing dropping funnel were combined 58.8 g (0.60 mole) maleic anhydride, 14.6 g di-t-butyl peroxide, 115 g methyl isobutyl ketone and 3.4 g (0.040 mole) glacial methacrylic acid. The system was purged with nitrogen and then heated to reflux under a static positive nitrogen pressure. A small amount of solids momentarily precipitated and then redissolved at about 100° C. When the reaction mixture reached reflux (about 115° C.), the remaining 31.0 g (0.36 mole) methacrylic acid in 60 g of methyl isobutyl ketone was added continuously over a 3-hour period. The reaction solution was refluxed for 15 minutes following the addition, 150 g of water was then added, and the ketone-water mixture refluxed for an additional hour. The isolation procedure of Example 4 was followed to produce a 57 weight percent aqueous solution of homogeneous hydrolyzed methacrylate/maleate copolymer of weight average molecular weight of 3390 and number average molecular weight of 610 in 98 weight percent yield.

EXAMPLE 6

Methacrylate/maleate copolymers were prepared by the procedures of Examples 1 and 4 varying the initiator concentration and the methacrylic acid addition times as indicated in Table 1. Homogeneous hydrolyzed copolymers having molecular weights indicated in the table were obtained.

TABLE 1

| Ex. | Procedure | Init wt %[1] | Addition Time, hr | Product[2] MW$_W$ | MW$_N$ |
|---|---|---|---|---|---|
| 6A | 1 | 5 | 5.0 | 5280 | 2080 |
| 6B | 1 | 7 | 3.25 | 3900 | 1540 |
| 6C | 1 | 11 | 3.25 | 3600 | 1300 |
| 6D | 1 | 14 | 3.25 | 3000 | 980 |
| 6E | 4 | 19 | 3.0 | 3370 | 1350 |
| 6F | 4 | 8 | 1.0 | — | — |
| 6G | 4 | 14 | 6.0 | 3240 | 1110 |

[1]initiator, weight percent of combined monomers
[2]product copolymer weight average molecular weight (MW$_W$) and number average molecular weight (MW$_N$)

EXAMPLE 7

The preparation of Example 1 is repeated with the exception that 54 g (0.55 mole) maleic anhydride is copolymerized with 39 g (0.45 mole) methacrylic acid in the presence of 23 g benzoyl peroxide initiator and 95 g 2-butanone (boiling point 80° C.) as solvent, the methacrylic acid is added continuously over a 5-hour period, the refluxing is continued for 10 minutes following the methacrylic acid addition and the copolymer is hydrolyzed by the addition of 210 g water at reflux temperature. A substantially homogeneous methacrylate/maleate copolymer similar to the product of Example 1 is obtained.

Repetition of the preparation using 13 g di-t-butyl peroxide rather than benzoyl peroxide as initiator, 95 g 2-pentanone (boiling point 102° C.) rather than 2-butanone as solvent and an addition period of 10 hours rather than 5 hours gives similar results.

EXAMPLE 8

The preparation of Example 4 is repeated with the exception that 39 g (0.40) mole maleic anhydride is copolymerized with 52 g (0.60 mole) methacrylic acid in the presence of 14 g di-t-butyl peroxide initiator and 945 g diethyl phthalate in a 2000 ml flask, the methacrylic acid is added over a 20-minute period at a polymerization temperature of 150° C., the reaction solution is held at the polymerization temperature for 10 minutes following the methacrylic acid addition, and the copolymer is hydrolyzed by the addition of 420 g water added at a temperature of 120° C. A substantially homogeneous hydrolyzed methacrylate/maleate copolymer is obtained.

COMPARATIVE EXAMPLE 1

In a 3-neck 500 ml round bottom flask equipped with reflux condenser, nitrogen inlet, thermometer and mechanical stirrer were added 58.8 g (0.60 mole) maleic anhydride, 34.4 g (0.40 mole) methacrylic acid, 120 g methyl isobutyl ketone and 14.6 g di-t-butyl peroxide. The flask was purged with dry nitrogen for five minutes, then maintained under a positive nitrogen pressure while the reaction mixture was heated to reflux. At about 98° C. the reaction became exothermic and a relatively large amount of solids precipitated. The mixture was refluxed (115° C.) for four hours, and the hydrolyzed aqueous copolymer was isolated by the procedure of Example 1. An aqueous hydrolyzed copolymer product showing a distribution with high and low molecular weight components as determined by HPLC was obtained in a weight yield of 119 percent.

COMPARATIVE EXAMPLE 2

The preparation of Example 4 was repeated substituting xylene for the n-butyl acetate solvent. A rubbery mass precipitated during the methacrylic acid addition, so seriously impeding the stirring that the stirring was discontinued. A nonhomogeneous product was isolated in 132 weight percent yield.

COMPARATIVE EXAMPLE 3

Methacrylate/maleate and acrylate/maleate (27/73 mole percent) copolymers were prepared in toluene and xylene, respectively, following Examples 1 and 2 of British patent specification No. 1,414,918. The preparations, as shown graphically in FIG. 2 for the methacrylate/maleate copolymer, resulted in nonhomogeneous copolymer products in weight yields of 131 and 155 weight percent, respectively.

COMPARATIVE EXAMPLE 4

Methacrylate/maleate (43/57 mole percent) copolymer was prepared following Example 1 of Netherlands patent application No. 7506874. The polymerization in toluene with benzoyl peroxide initiator was mildly exothermic and heterogeneous. The resulting copolymer was nonhomogeneous.

COMPARATIVE EXAMPLE 5

Methacrylate/maleate (12/88 mole percent) copolymer was prepared following Example 1 of U.S. Pat. No. 3,755,264. The polymerization conducted in toluene resulted in a precipitated polymer gummy in nature and a nonhomogeneous hydrolyzed copolymer isolated in 125 weight percent yield.

COMPARATIVE EXAMPLE 6

Acrylate/maleate (80/20 mole percent) copolymer was prepared in water following the procedure of Example 1 of U.S. Pat. No. 3,635,915. The product, essentially a high molecular weight polyacrylate mixed with more than 50 percent of the initially charged maleic anhydride as maleic acid, was obtained in 100 percent weight yield.

EXAMPLE 9

The methacrylate/maleate and acrylate/maleate copolymers of the preceding examples were tested in a laboratory single-stage flash evaporator to determine their scale control performance. The operation of the laboratory evaporator and the method of testing was as described by Auerbach and Carruthers in Desalination, 31, 279 (1979). Both Atlantic Ocean seawater and a synthetic seawater were used in the testing, the latter being the "Standard Synthetic Seawater Composition" of the Office of Saline Water containing an augmented bicarbonate content of 0.25 g/kg.

Results of the testing are summarized in Table 2. The copolymer antiscalant dosage is reported in parts per million (ppm) of active solids. The percent deposited scale is calculated from the equation:

$$\% \text{ deposited scale} = \frac{200 \times \text{millimoles deposited scale}}{\text{millimoles bicarbonate in brine.}}$$

Copolymers which provide lower "% deposited scale" at a given dosage afford superior performance.

TABLE 2

| Copolymer Example | Dosage, ppm active | Brine | % Deposited Scale |
|---|---|---|---|
| 1 | 3 | synthetic | 12.4 |
| 4 | 3 | synthetic | 15.8 |
| Comp. Ex 1 | 3 | synthetic | 22.0 |
| Comp. Ex 2 | 3 | synthetic | 18.1 |
| Comp. Ex 3 | 3 | synthetic | 26.5 |
| 6A | 4 | Atlantic Ocean | 17.6 |
| 6B | 4 | Atlantic Ocean | 16.0 |
| 6C | 4 | Atlantic Ocean | 7.7 |
| 6D | 4 | Atlantic Ocean | 5.3 |

These test results clearly show the scale-inhibiting superiority of the essentially homogenous, controlled low molecular weight acrylate/maleate copolymers of the present invention over the nonhomogeneous copolymers of the prior art prepared under heterogeneous conditions.

I claim:

1. A substantially homogeneous copolymer consisting essentially of from about 35 to 65 mole percent acrylic or methacrylic acid repeat units and from about 65 to 35 mole percent maleic acid repeat units and having a number average molecular weight of from about 500 to 5000, or an alkali metal, ammonium or amine salt thereof.

2. An aqueous solution containing the copolymer of claim 1 in the amount of from about 1 to 60 percent by weight.

* * * * *